United States Patent
Montemurro et al.

(10) Patent No.: US 9,210,640 B2
(45) Date of Patent: *Dec. 8, 2015

(54) MEASURE OF QUALITY OF LINK BETWEEN MOBILE STATION AND BASE STATION

(71) Applicant: BlackBerry Limited, Waterloo (CA)

(72) Inventors: Michael Peter Montemurro, Toronto (CA); Roger Paul Durand, Amherst, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 14/134,923

(22) Filed: Dec. 19, 2013

(65) Prior Publication Data

US 2014/0105182 A1   Apr. 17, 2014

Related U.S. Application Data

(63) Continuation of application No. 13/348,517, filed on Jan. 11, 2012, now Pat. No. 8,620,325, which is a continuation of application No. 11/924,341, filed on Oct. 25, 2007, now Pat. No. 8,126,454.

(60) Provisional application No. 60/863,254, filed on Oct. 27, 2006.

(51) Int. Cl.
*H04M 1/00* (2006.01)
*H04W 36/30* (2009.01)
*H04L 12/26* (2006.01)

(52) U.S. Cl.
CPC ........... *H04W 36/30* (2013.01); *H04L 43/0847* (2013.01)

(58) Field of Classification Search
CPC ...... H04W 36/30; H04W 36/18; H04W 36/08
USPC ................. 455/437, 550.1, 515, 552.1, 422.1
See application file for complete search history.

(56) References Cited

U.S. PATENT DOCUMENTS 5,603,096 A   2/1997   Gilhousen et al.
6,757,520 B2   6/2004   Attar et al.
(Continued)

FOREIGN PATENT DOCUMENTS

CN   1471767   1/2004
WO   0231987   4/2002
(Continued)

OTHER PUBLICATIONS

Office Action mailed Dec. 8, 2011, in corresponding Chinese application No. 200780039978.7.
(Continued)

*Primary Examiner* — Nghi H Ly

(57) ABSTRACT

A mobile station associated with a base station determines a measure of the quality of a communication link between the mobile station and the base station. The measure is determined by comparing either i) an expected data rate for communications over the link and an actual data rate of communications over the link, wherein the expected data rate takes into account radio frequency (RF) power levels of signals received at the mobile station over the link, or ii) an expected RF power level for communications over the link and RF power levels of signals received at the mobile station over the link, wherein the expected RF power level takes into account the actual data rate of communications over the link. This measure of the quality of the link may be a factor in triggering the mobile station to initiate a handoff.

16 Claims, 6 Drawing Sheets

(56) References Cited

U.S. PATENT DOCUMENTS

| | | | |
|---|---|---|---|
| 8,126,454 B2* | 2/2012 | Montemurro et al. | 455/427 |
| 8,620,325 B2* | 12/2013 | Montemurro et al. | 455/437 |
| 2002/0072384 A1 | 6/2002 | Chheda | |
| 2003/0003913 A1 | 1/2003 | Chen et al. | |
| 2003/0153311 A1 | 8/2003 | Black | |
| 2005/0271021 A1 | 12/2005 | Alemany et al. | |
| 2006/0035636 A1 | 2/2006 | Pirila | |
| 2007/0142058 A1 | 6/2007 | Matsumura et al. | |

FOREIGN PATENT DOCUMENTS

| | | |
|---|---|---|
| WO | 0251046 | 6/2002 |
| WO | 2006026090 | 3/2006 |
| WO | 2006071396 | 7/2006 |

OTHER PUBLICATIONS

Office Action mailed Apr. 20, 2011, in corresponding Chinese patent application No. 200780039978.7.

National Spectrum Managers Association, Report WG 5.92.008, Report & Tutorial Carrier-to_Interference Objectives, dated Jan. 1992.

International Preliminary Report on Patentability mailed Jan. 12, 2009, in corresponding PCT patent application No. PCT/CA2007/001933.

Written Opinion on the International Searching Authority mailed Jan. 18, 2009, in corresponding PCT patent application No. PCT/CA2007/001933.

Extended European Search Report mailed Jan. 12, 2009, in corresponding European patent application No. 07816083.5.

Second Examination report mailed Mar. 4, 2010, in corresponding European patent application No. 07816083.5.

Final Office Action mailed Mar. 24, 2011, in corresponding U.S. Appl. No. 11/924,341.

Notice of Allowance and Fee(s) Due mailed Oct. 11, 2011, in corresponding U.S. Appl. No. 11/924,341.

English abstract for CN1471767, published on Jan. 28, 2004.

English translation of the Third Office Action mailed Jul. 31, 2012, in corresponding Chinese patent application No. 200780039978.7.

Office Action mailed Aug. 9, 2012, in corresponding Canadian patent application No. 2,666,971.

* cited by examiner

MEASURE OF QUALITY OF LINK BETWEEN MOBILE STATION AND BASE STATION

BACKGROUND

As used herein, the term "handoff" is intended to include transfers between networks of the same type and networks of different types, and also to include transfers while a mobile station is in idle mode and transfers while a mobile station is in an active communication session such as a telephone call.

A mobile station that is able to communicate with access points (APs) of wireless local area networks (WLANs) will typically make a decision to trigger a handoff based on the received signal strength indicator (RSSI) of signals received at the mobile station. The decision may be based on signals that originate from the AP with which the mobile station is currently associated or on signals that originate from other APs or on both types of signals. The other APs may belong to the same WLAN as the AP with which the mobile station is currently associated or may belong to a different WLAN. Handoffs from one WLAN to another may require more time to complete than handoffs within the same WLAN. For example, if the mobile station needs to obtain a new Internet Protocol (IP) address as part of the handoff, then the handoff will typically require more time than if the mobile station could maintain its current IP address. New IP addresses may be required if the mobile station performs the handoff across networks or across subnets of the same network.

If the mobile station is also able to communicate with base stations of a wireless wide area network (WWAN), for example, a cellular telephone network, then the decision to trigger a handoff from a WLAN to the cellular network is also typically made based on the RSSI of signals received at the mobile station. The decision may be based on signals that originate from the AP with which the mobile station is currently associated or on signals that originate from one or more of the base stations or on both types of signals. Handoffs from a WLAN to a cellular network typically require more time to complete than handoffs from one AP to another AP.

While many different schemes for triggering handoffs have been proposed, most schemes are directed at achieving one or more of the following general objectives:
a) A mobile station should look to perform a handoff before it loses its WLAN connection;
b) A handoff ought to take a minimum amount of time; and
c) A handoff from a WLAN to a cellular network ought to be completed while the mobile station is still in an area of overlapping coverage between the WLAN and the cellular network.

However, it is well known that under certain circumstances the handoffs fail to achieve these objectives. If a WLAN connection is lost or if its link quality deteriorates significantly before or during a handoff, communications over the WLAN connection may suffer. For example, a telephone call being carried over the WLAN connection may be disconnected or suffer unacceptable noise or delays.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

Figure 1:
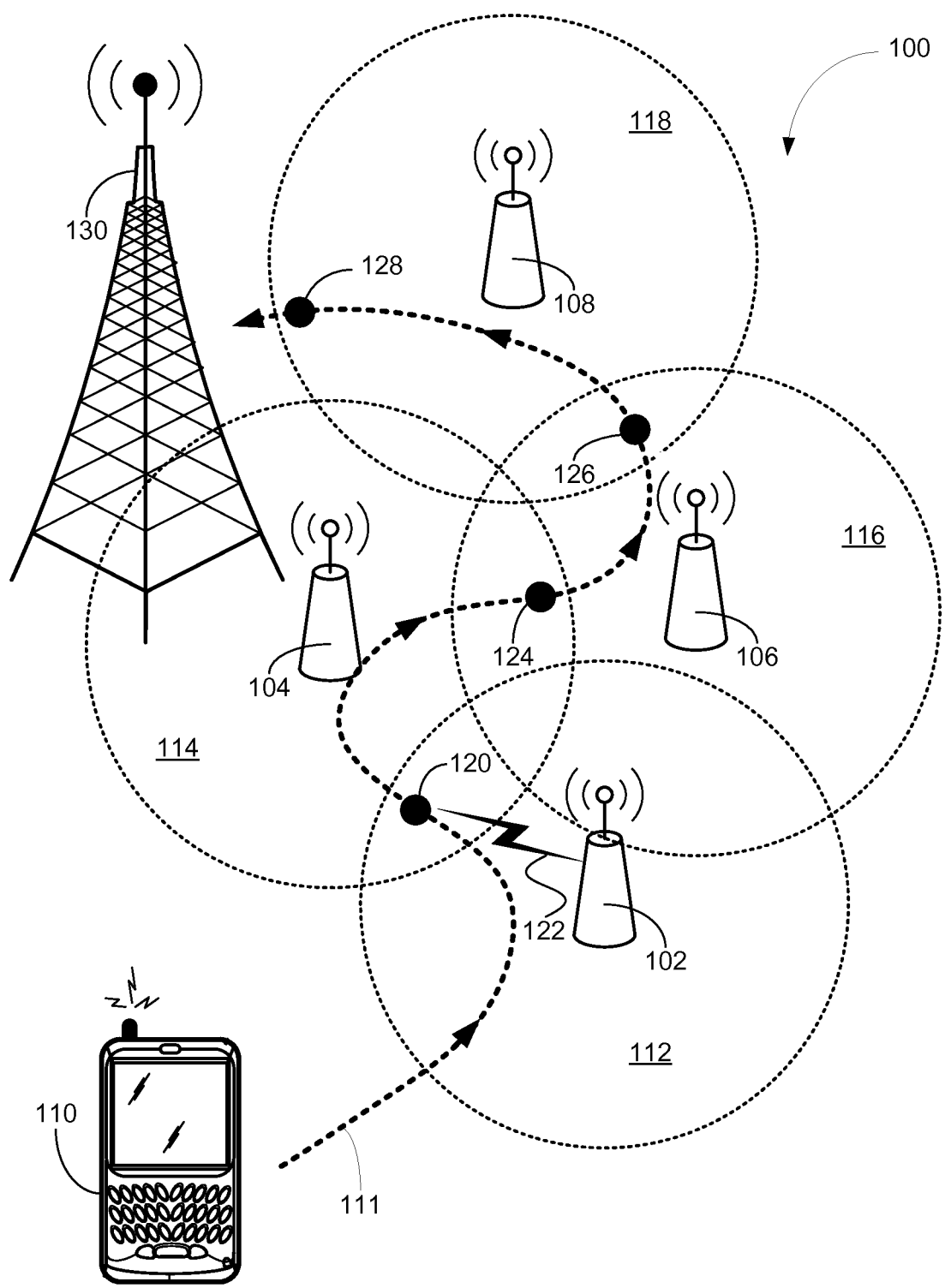
FIG. 1 is a schematic illustration of an exemplary communication system.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Some wireless local area networks (WLANs) operate in an unlicensed frequency band and may therefore be subject to interference from non-WLAN devices operating in the same frequency band. For example, IEEE 802.11 WLANs, also known as "Wi-Fi networks", operate in the unlicensed 2.4 GHz and 5 GHz bands. The 2.4 GHz band is also used by cordless telephones, microwave ovens, baby monitors, Bluetooth® devices, ZigBee™ devices and WirelessUSB™ devices. The lower portion of the 5 GHz band is used by satellite to ground links, and the middle portion of the 5 GHz band is used by RADAR devices. There is a general assumption among persons of ordinary skill in the art that since the cellular spectrum is licensed, it is relatively clean of interference.

WLAN devices have multiple data rates at which they can communicate. For example, IEEE 802.11b devices can communicate at 1 Mbps (megabits per second), 2 Mbps, 5.5 Mbps and 11 Mbps. IEEE 802.11g/a devices can communicate at 1 Mbps, 2 Mbps, 5.5 Mbps, 6 Mbps, 9 Mbps, 11 Mbps, 12 Mbps, 18 Mbps, 24 Mbps, 36 Mbps, 48 Mbps, and 54 Mbps. As is well known in the art, if a signal is received at a certain power level, one can expect a certain data rate for the signal in keeping with the signal-to-noise ratio (SNR).

In the presence of interference, various error rates or loss rates or both may increase. For example, any of the bit error rate (BER), the packet error rate (PER), and the packet loss rate (PLR) may be such that the WLAN devices are forced to communicate at lower data rates, even though the radio frequency (RF) transmission power level of the devices (and hence, the received signal strength) remains high. There are also other situations in which received signal strength may be high, yet communication will be conducted at a lower data rate than what is expected for that received signal strength. For example, certain APs may have been configured to communicate at lower data rates than what a communication standard allows.

As explained in the Background, typical mobile stations are triggered to roam based on the RSSI of signals received at the mobile station. If the RSSI is high, a typical mobile station communicating at a relatively low data rate with an AP will not be prompted to seek an AP with which it can communicate at a higher data rate. Likewise, if the RSSI is high, a typical mobile station that is also capable of cellular communications will not be prompted to seek a cellular base station with which it can communicate at a higher data rate. Likewise, if the RSSI is high, a typical mobile station that is also capable of Wireless Metropolitan Area Network (WMAN) communications, for example, Worldwide Interoperability for Microwave Access (WiMAX) communications, will not be prompted to seek a Head End (WMAN) or base station (WiMAX) with which it can communicate at a higher data rate.

In the following description and claims, the term "base station" is intended to encompass an access point (AP) of a WLAN (e.g. a Wi-Fi network), a base station of a WWAN (e.g. a cellular network), and a Head End of a WMAN (e.g. a WiMAX network).

In one aspect, a mobile station associated or otherwise connected with a base station determines a measure of the quality of a communication link between the mobile station and the base station. The measure takes into account (a) RF power levels of signals received at the mobile station over the link and (b) an actual data rate of communications over the link. The actual data rate may have been derived by the mobile station and the base station, or may be the result of negotiation or the use of a data rate adaptation algorithm or both. For example, a data rate adaptation algorithm may drop or lower the data rate in response to two packet errors occurring in a short time period, and may raise or increase the data rate in response to having three or more successful packet transmissions occurring in a similar or longer time period. This measure of the quality of the link may be a factor in triggering the mobile station to initiate a handoff.

In some cases, the mobile station may preferentially select as its handoff target a base station known to have less interference. For example, if a base station operating in the 5 GHz band is available, the mobile station may prefer to roam to that base station rather than to base stations operating in the 2.4 GHz band.

Determining the measure of the quality of the link may involve determining an expected data rate for communications over the link based on the power levels, and comparing the expected data rate to the actual data rate. If the actual data rate is lower than expected for the measured RF power level, then it may be an indication that the link quality is suffering from degradations. The degradation may be due to interference or multipath or other causes of degradation or any combination thereof. As the degradation increases, the measure of link quality will decrease. The degree to which the actual data rate is lower than expected for the measured RF power level may therefore be used as a measure of the degradation. The mobile station may use the measure of link quality to infer the presence of degradations on the link.

The measure of link quality may be abstracted to indicate whether the actual data rate is at or lower than an expected data rate for the measured RF power level. For example, the measure of link quality may be abstracted as high, medium or low. If the actual data rate is as expected or is close to as expected for the measured RF power level, then the measure of link quality may be considered high. If the actual data rate is lower than expected for the measured RF power level, then the measure of link quality may be considered low or medium, depending on how much lower the actual data rate is than the expected data rate.

RSSI is a measure of the RF power level, but is known to vary with the noise level. Other measures of the RF power level are also contemplated in the determination of the measure of link quality. For example, the received channel power indicator (RCPI) defined in IEEE 802.11k is intended to measure the RF power in the presence of noise and may be used to determine the measure of the quality of a communication link. Measurements used to determine the RF power level may be averaged over an interval, the duration of which may be configurable. For example, the RSSI or RCPI measurements may be averaged over a number of packets communicated over the link.

A mobile station may be associated or otherwise connected with more than one base station at the same time. For example, the mobile station may be capable of communications with different types of networks and may be associated or otherwise connected with different base stations of different types of networks. A measure of the quality of a communication link may be determined for any of the links between the mobile station and the different base stations. For each link, the measure takes into account (a) RF power levels of signals received at the mobile station over the link and (b) an actual data rate of communications over the link.

The link quality measures of more than one communication link may be factors in determining whether to trigger the mobile station to initiate a handoff. Similarly, a target for the handoff may be selected from among the different base stations based, at least in part, on the measure of the quality of the link between the mobile station and the targeted base station. For example, if a mobile station is simultaneously connected to a WLAN base station and to a WiMAX base station, and the mobile station is handling a communication session via the WiMAX base station, the mobile station may determine to transfer the communication session to the link between the mobile station and the WLAN base station. This determination may be based, at least in part, on the measures of the quality of the links between the mobile station and WiMAX base station and WLAN base station, respectively.

FIG. 1 illustrates an exemplary communication system 100. Communication system 100 comprises several APs, of which APs 102, 104, 106 and 108 are shown. Any of APs may provide a connection to a general access network (GAN) controller, to a Call Session Control Functions (CSCF) server, or to any other suitable type of infrastructure. As a mobile station 110 is carried along a trajectory 111 through the coverage areas 112, 114, 116 and 118, respectively, of APs 102, 104, 106 and 108, mobile station 110 may calculate a measure of the quality of a wireless link between itself and the AP with which it is currently associated. The link quality measure, which is a function of the actual data rate and the RF power level of communications on the link, may be a factor in triggering mobile station 110 to perform a handoff from the AP with which it is associated.

At a location 120, for example, mobile station 110 may be associated with AP 102. Mobile station 110 may calculate a measure of the quality of a wireless link 122 with AP 102, where the measure takes into account the strength of signals from AP 102 received at mobile station 110 and the data rate which mobile station 110 and AP 102 have derived for communications over wireless link 122. Mobile station 110 may then determine whether to trigger initiation of a handoff from AP 102 based, at least in part, on the link quality measure it has calculated. Other factors may also be considered by mobile station 110 when determining whether to trigger initiation of a handoff. Once triggered, mobile station 110 may scan for other APs, detect AP 104 and perform a handoff from AP 102 to AP 104. AP 102 and AP 104 may belong to the same subnet of a WLAN.

At a location 124, mobile station 110 may trigger initiation of a handoff from AP 104, scan for other APs, detect AP 106 and perform a handoff from AP 104 to AP 106. AP 104 and AP 106 may belong to different subnets of the same WLAN, and therefore the handoff from AP 104 to AP 106 may take longer to complete than the handoff from AP 102 to AP 104.

At a location 126, mobile station 110 may trigger initiation of a handoff from AP 106, scan for other APs, detect AP 108 and perform a handoff from AP 106 to 108. AP 106 and AP 108 may belong to different WLANs, and therefore the handoff from AP 106 to AP 108 may take longer to complete than the handoff from AP 102 to AP 104.

At a location 128, mobile station 110 may trigger initiation of a handoff from AP 108, scan for other APs and not detect any other APs. The WLAN connection may be lost as mobile station 110 exits the coverage area 118 of AP 108.

If, however, mobile station 110 is also able to communicate with base stations of cellular networks, then at location 128, mobile station 110 may also search for base stations of cellular networks with which it is compatible and authorized to establish a service connection. If, for example, at location 128, mobile station 110 detects a base station 130 of a cellular network, mobile station 110 may perform a handoff from AP 108 to base station 130. Likewise, assuming that the coverage area of base station 130 encompasses the coverage areas of APs 102-108, mobile station 110 may have performed a handoff to base station 130 at any of locations 120, 124 and 126 to the cellular network.

Alternatively, mobile station 110 may have been connected with base station 130 while connected with AP 102 and when measuring the quality of link 122 while at location 120, mobile station 110 may have also measured the quality of a link between mobile station 110 and base station 130. Based on the two link quality measures, mobile station 110 may have determined to transfer a communication session being handled via AP 102 to the link between mobile station 110 and base station 130.

Figure 2:
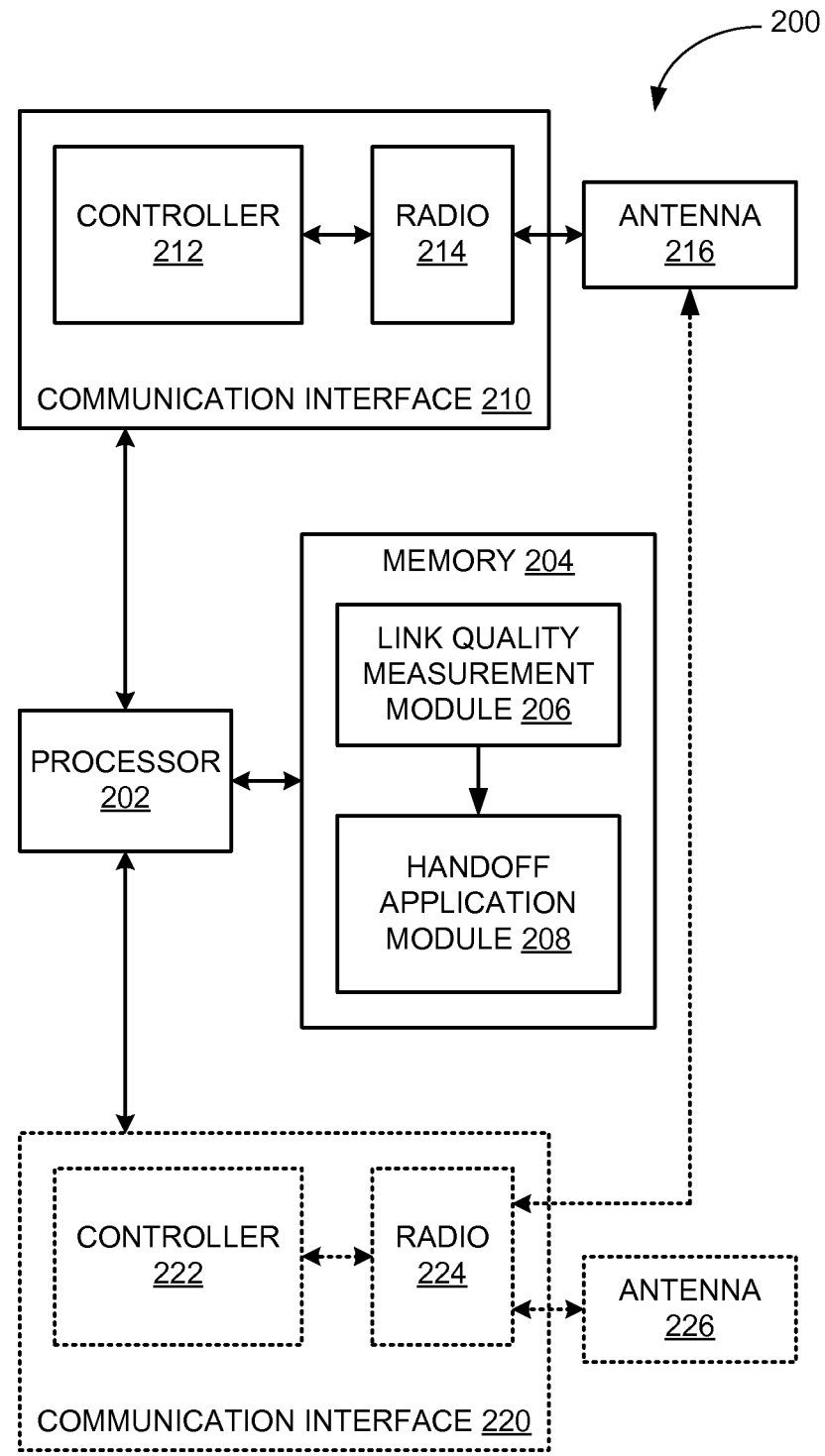
FIG. 2 is a block diagram of an exemplary mobile station.

FIG. 2 is a block diagram of an exemplary mobile station. A mobile station 200 comprises a processor 202, and a memory 204 coupled to processor 202. Memory 204 stores the components of link quality measurements and data rate in a module 206 that, when executed by processor 202, may implement the methods described herein.

Mobile station 200 comprises a wireless communication interface 210 compatible with a first wireless communication standard. For example, wireless communication interface 210 is compatible with one or more WLAN standards, for example, one or more standards of the family of IEEE 802.11 wireless communication standards. Wireless communication interface 210 is coupled to processor 202 and includes at least a WLAN controller 212 and a radio 214. Mobile station 200 also comprises an antenna 216 coupled to radio 214. For example, mobile station 200 may be able to communicate with APs via wireless communication interface 210 and antenna 216.

Memory 204 also stores a handoff application module 208 that, when executed by processor 202, determines when to initiate handoff from an access point and controls wireless communication interface 210 accordingly.

Mobile station 200 may also comprise a wireless communication interface 220 compatible with a second wireless communication standard. For example, wireless communication interface 220 is compatible with one or more wireless WWAN/WMAN communication standards. Wireless communication interface 220 is coupled to processor 202 and includes at least a baseband controller 222 and a radio 224. Radio 224 may be coupled to antenna 216, or mobile station 200 may comprise an additional antenna 226 coupled to radio 224. Mobile station 200 may be able to communicate via wireless communication interface 220 and antenna 216 or 226 with base stations of a WWAN/WMAN network.

Mobile station 200 includes other components that, for clarity, are not shown in FIG. 2. A non-exhaustive product list of examples for mobile station 200 includes a wireless-enabled laptop computer, a wireless-enabled tablet computer, a wireless-enabled cellphone, a wireless-enabled personal digital assistant (PDA), a wireless-enabled smart phone, a wireless-enabled video camera/monitor, a wireless-enabled gaming/multimedia console, a wireless-enabled sensor/reporting/storage device, a wireless Internet Protocol (IP) phone and any other suitable mobile station.

Figure 3:
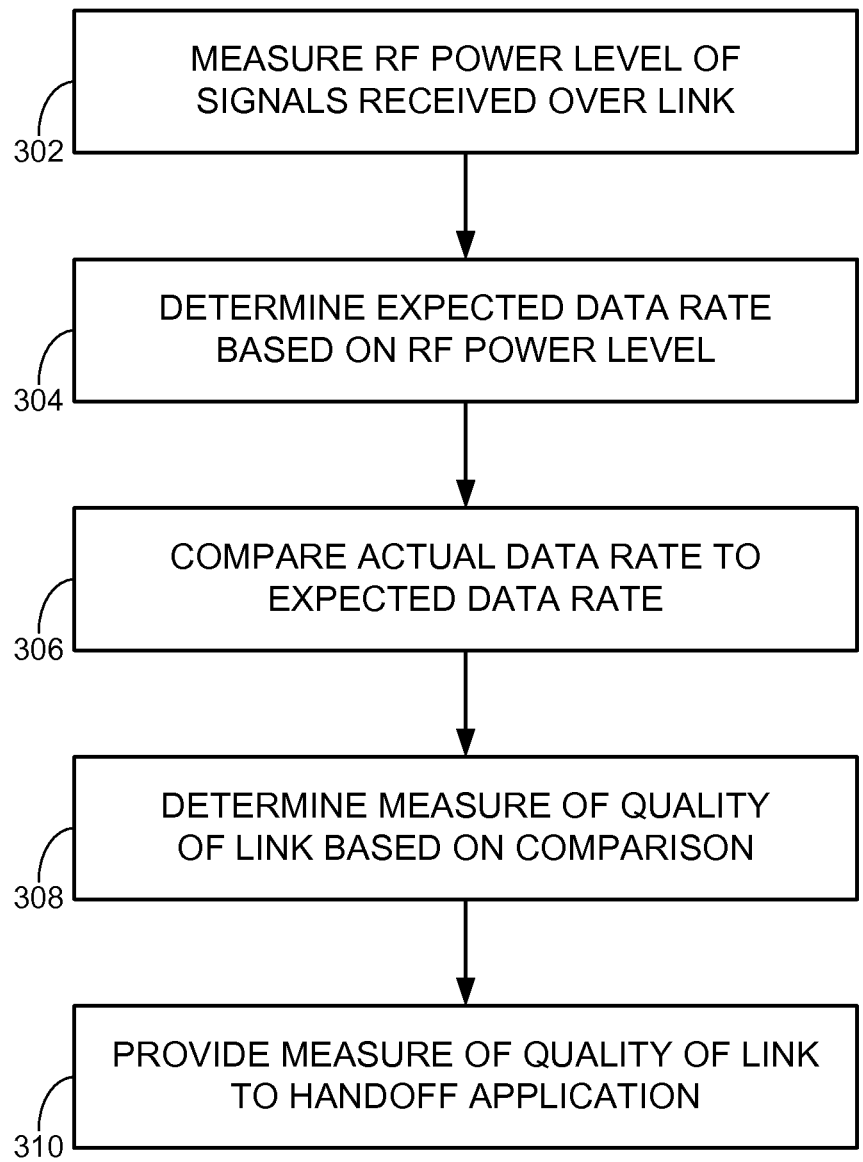
FIG. 3 is a flowchart of an exemplary method for calculating a measure of the quality of a link between a mobile station and a base station.

FIG. 3 is a flowchart of an exemplary method for calculating a measure of the quality of a link between a mobile station and a base station. At 302, the mobile station measures the RF power level of signals received at the mobile station from the base station with which the mobile station is currently associated or otherwise connected. The RF power level may be measured, for example, in dBm, which is decibels relative to a power level of one milliwatt. For example, the mobile station obtains signal strength measurements of the signals. Signal strength measurements, for example, RSSI, may be averaged over a time interval, the duration of which may be configurable. The duration of the interval may be a number of packets, with an increasing number of packets improving measurement resolution/accuracy and reducing measurement errors with the tradeoff or cost of overall measurement time delay to respond to a valid condition. In another example, the mobile station obtains RCPI measurements of the signals, which may be averaged over an interval, the duration of which may be configurable.

At 304, link quality measurement module 206 may determine an expected data rate based on the RF power level measured at 302. A look-up table may be employed to determine the expected data rate. The look-up table may be based on field measured data, laboratory measured data, expected receiver performance, manufacturing calibration data, or any combination thereof.

An example of such a look-up table for IEEE 802.11b devices follows, assuming a data rate algorithm derives a packet error rate of <1 in 1000 and the radio noise floor plus other radio implementation errors equal −95 dBm:

| Received Power Level | Expected Data Rate |
|---|---|
| −83 dBm or higher | 11 Mbps |
| −86 dBm to −84 dBm | 5.5 Mbps |
| −89 dBm to −87 dBm | 2 Mbps |
| −90 dBm or lower | 1 Mbps |

An example of such a look-up table for IEEE 802.11g/a devices follows, assuming a data rate algorithm derives a packet error rate of <1 in 1000 and the radio noise floor plus other radio implementation errors equal −95 dBm:

| Received Power Level | Expected Data Rate |
|---|---|
| −68 dBm or higher | 54 Mbps |
| −72 dBm to −69 dBm | 48 Mbps |
| −76 dBm to −73 dBm | 36 Mbps |
| −80 dBm to −77 dBm | 24 Mbps |

| Received Power Level | Expected Data Rate |
| --- | --- |
| −83 dBm to −81 dBm | 18 Mbps |
| −85 dBm to −84 dBm | 12 Mbps |
| −87 dBm to −86 dBm | 9 Mbps |
| −88 dBm or lower | 6 Mbps |

IEEE 802.11n, which is a proposed amendment to the IEEE 802.11 physical (PHY) layer, is expected to have many more data rates than IEEE 802.11b or IEEE 802.11a/g. This increase in the number of data rates means that the dBm ranges of received power level for an expected data rate will be smaller for any one rate.

Cellular technology currently has limited data rate adaptation, but it is contemplated that more data rate choices will be available in future cellular network standards.

As is known in the art, a mobile station and the base station with which it is associated or otherwise connected will derive or negotiate, or adapt, or any combination thereof, to an actual data rate for communications over the link between the mobile station and the base station. At 306, link quality measurement module 206 may compare this actual data rate to the expected data rate determined at 304.

At 308, link quality measurement module 206 may determine a measure of the quality of the link based on the results of the comparison done at 304. The measure of the quality of the link may be abstracted to three values (high, medium, low). Abstractions to two values and abstractions to more than three values are also contemplated.

At 310, link quality measurement module 206 may provide the measure of the quality of the link to handoff application module 208.

Figure 4:
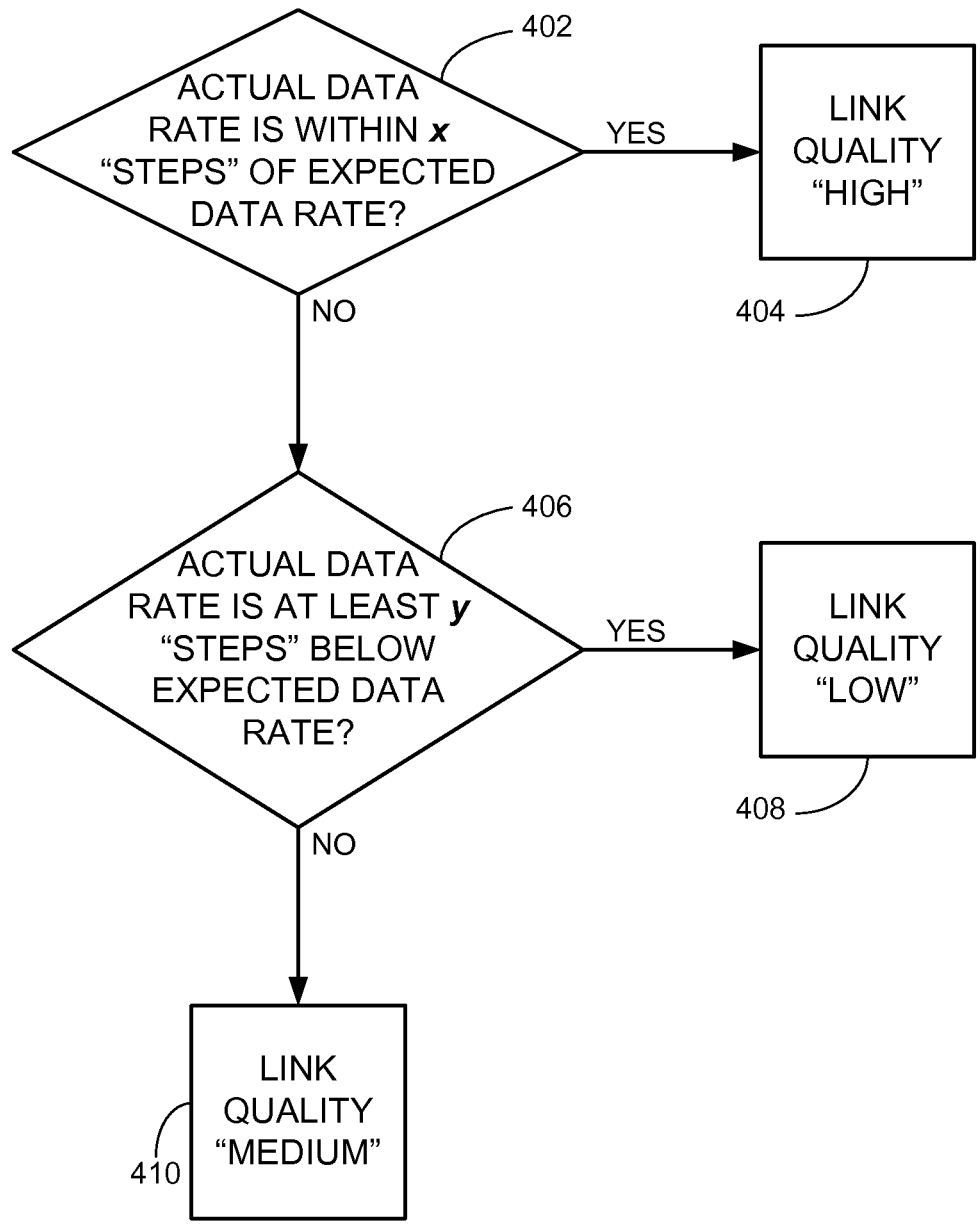
FIG. 4 is a flowchart of an exemplary method for determining a measure of the quality of a link based on the results of a comparison between an expected data rate and the actual data rate.

FIG. 4 is a flowchart of an exemplary method for determining a measure of the quality of a link based on the results of a comparison between an expected data rate and an actual data rate. In this exemplary method, the quality of the link has been abstracted to three values: high, medium and low.

If the actual data rate is within x "steps" of the expected data rate on the scale of allowable data rates, as checked at 402, then the quality of the link is determined at 404 to be "high". If the actual data rate is y or more "steps" below the expected data rate on the scale of allowable data rates, as checked at 406, then the quality of the link is determined at 408 to be "low". If neither of these conditions is met, then the quality of the link is determined at 410 to be "medium". The values of x and y will depend upon the total number of allowable data rates and on how the abstraction is to be handled.

For example, for IEEE 802.11b devices, x may be set to zero, and y may be set to two. If the expected data rate (based on the RF power levels of the received signals) is 11 Mbps and the actual data rate is 2 Mbps or 1 Mbps, then the quality of the link is "low".

In another example, for IEEE 802.11g/a devices, x may be set to one, and y may be set to three. If the expected data rate (based on the RF power levels of the received signals) is 48 Mbps and the actual data rate is 18 Mbps or less, then the quality of the link is "low". If the actual data rate is 48 Mbps or 36 Mbps, then the quality of the link is "high". If the actual data rate is 24 Mbps, then the quality of the link is "medium".

It is obvious to a person of ordinary skill in the art how to modify the method of FIG. 4 to abstractions of two values and to abstractions of more than three values.

It is also obvious to a person of ordinary skill in the art to modify the methods described herein as follows: instead of determining an expected data rate based on the RF power level and comparing the actual data rate to the expected data rate, the method could involve determining an expected RF power level based on the actual data rate and comparing the expected RF power level to a measured RF power level. If the measured RF power level is higher than expected for the actual data rate, then it may be an indication that the link quality is suffering from degradations. The degradation may be due to interference or multipath or other causes of degradation or any combination thereof. As the degradation increases, the measure of link quality will decrease. The degree to which the measured RF power level is higher than expected for the actual data rate may therefore be used as a measure of the degradation. The mobile station may use the measure of link quality to infer the presence of degradations on the link.

The measure of link quality may be abstracted to indicate whether the measured RF power level is at or higher than an expected RF power level for the measured actual data rate. For example, the measure of link quality may be abstracted as high, medium or low. If the measured RF power level is as expected or is close to as expected for the measured actual data rate, then the measure of link quality may be considered high. If the measured RF power level is higher than expected for the measured actual data rate, then the measure of link quality may be considered low or medium, depending on how much higher the measured RF power level is than the expected RF power level.

Figure 5:
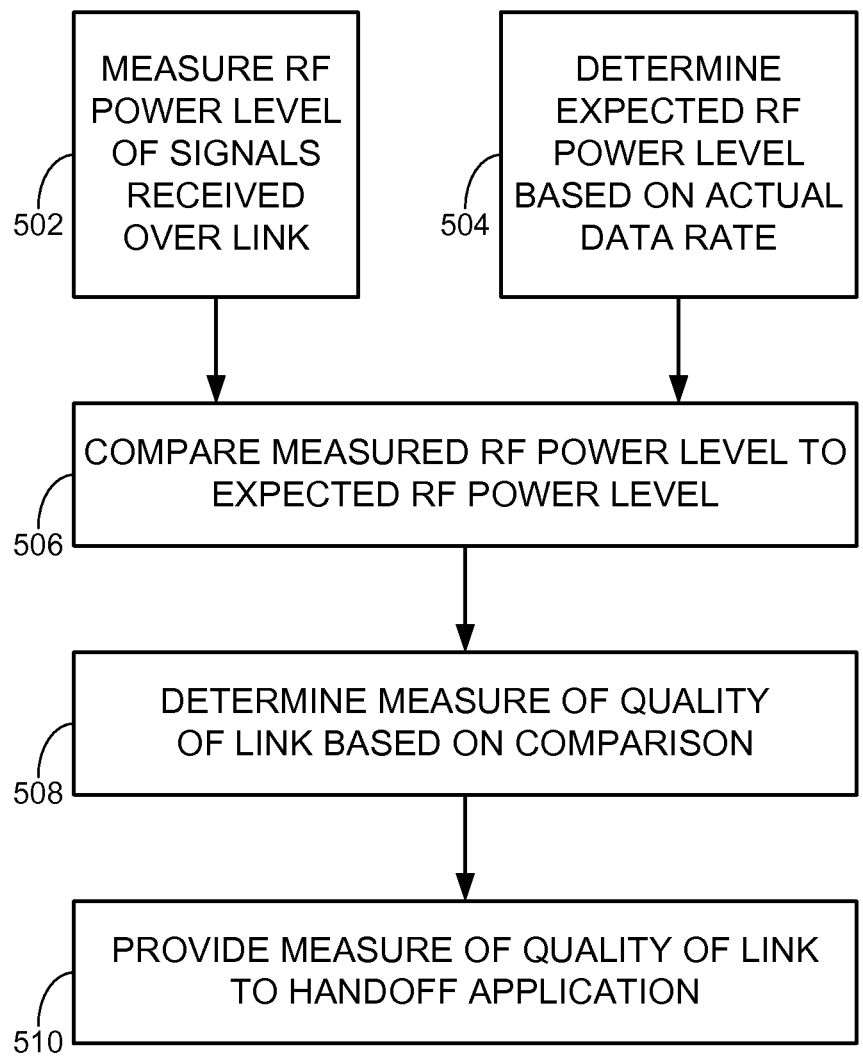
FIG. 5 is a flowchart of another exemplary method for calculating a measure of the quality of a link between a mobile station and a base station.

FIG. 5 is a flowchart of an exemplary method for calculating a measure of the quality of a link between a mobile station and a base station. At 502, the mobile station measures the RF power level of signals received at the mobile station from the base station with which the mobile station is currently associated or otherwise connected. The RF power level may be measured, for example, in dBm, which is decibels relative to a power level of one milliwatt. For example, the mobile station obtains signal strength measurements of the signals. Signal strength measurements, for example, RSSI, may be averaged over a time interval, the duration of which may be configurable. The duration of the interval may be a number of packets, with an increasing number of packets improving measurement resolution/accuracy and reducing measurement errors with the tradeoff or cost of overall measurement time delay to respond to a valid condition. In another example, the mobile station obtains RCPI measurements of the signals, which may be averaged over an interval, the duration of which may be configurable.

As is known in the art, a mobile station and the base station with which it is associated or otherwise connected will derive or negotiate or adapt, or any combination thereof, to an actual data rate for communications over the link between the mobile station and the base station. At 504, link quality measurement module 206 may determine an expected RF power level based on the actual data rate. A look-up table may be employed to determine the expected RF power level. The look-up table may be based on field measured data, laboratory measured data, expected receiver performance, manufacturing calibration data, or any combination thereof.

An example of such a look-up table for IEEE 802.11b devices follows, assuming a data rate algorithm derives a packet error rate of <1 in 1000 and the radio noise floor plus other radio implementation errors equal −95 dBm:

| Actual Data Rate | Expected Power Level |
|---|---|
| 11 Mbps | −83 dBm or higher |
| 5.5 Mbps | −86 dBm to −84 dBm |
| 2 Mbps | −89 dBm to −87 dBm |
| 1 Mbps | −90 dBm or lower |

An example of such a look-up table for IEEE 802.11g/a devices follows, assuming a data rate algorithm derives a packet error rate of <1 in 1000 and the radio noise floor plus other radio implementation errors equal −95 dBm:

| Actual Data Rate | Expected Power Level |
|---|---|
| 54 Mbps | −68 dBm or higher |
| 48 Mbps | −72 dBm to −69 dBm |
| 36 Mbps | −76 dBm to −73 dBm |
| 24 Mbps | −80 dBm to −77 dBm |
| 18 Mbps | −83 dBm to −81 dBm |
| 12 Mbps | −85 dBm to −84 dBm |
| 9 Mbps | −87 dBm to −86 dBm |
| 6 Mbps | −88 dBm or lower |

IEEE 802.11n, which is a proposed amendment to the IEEE 802.11 physical (PHY) layer, is expected to have many more data rates than IEEE 802.11b or IEEE 802.11a/g. This increase in the number of data rates means that the dBm ranges of expected power level for an actual data rate will be smaller for any one rate.

Cellular technology currently has limited data rate adaptation, but it is contemplated that more data rate choices will be available in future cellular network standards.

At 506, link quality measurement module 206 may compare the measured RF power level to the expected RF power level determined at 304.

At 508, link quality measurement module 206 may determine a measure of the quality of the link based on the results of the comparison done at 304. The measure of the quality of the link may be abstracted to three values (high, medium, low). Abstractions to two values and abstractions to more than three values are also contemplated.

At 510, link quality measurement module 206 may provide the measure of the quality of the link to handoff application module 208.

Figure 6:
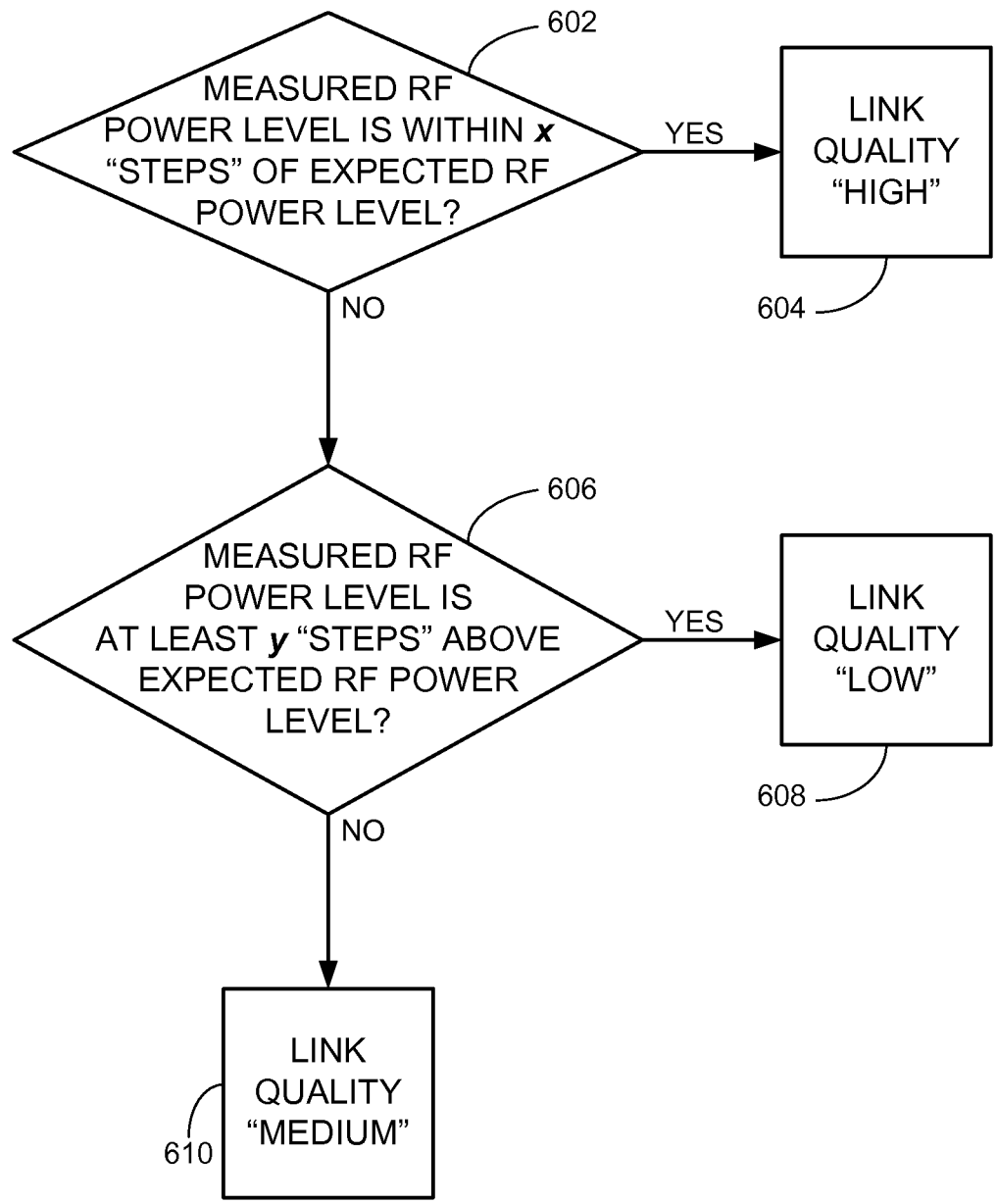
FIG. 6 is a flowchart of an exemplary method for determining a measure of the quality of a link based on the results of a comparison between the measured RF power level and an expected RF power level as derived from the actual data rate.

FIG. 6 is a flowchart of an exemplary method for determining a measure of the quality of a link based on the results of a comparison between an expected RF power level and a measured RF power level. In this exemplary method, the quality of the link has been abstracted to three values: high, medium and low.

If the measured RF power level is within x "steps" or x dB of the expected RF power level on the scale of allowable data rates, as checked at 602, then the quality of the link is determined at 604 to be "high". If the measured RF power level is y or more "steps" or is at least y dB above the expected RF power level on the scale of allowable data rates, as checked at 606, then the quality of the link is determined at 608 to be "low". If neither of these conditions is met, then the quality of the link is determined at 610 to be "medium". The values of x and y will depend upon the total number of allowable data rates and on how the abstraction is to be handled either as a finite number of explicit data rates or are converted relative to a common measure such as dBm.

It is obvious to a person of ordinary skill in the art how to modify the method of FIG. 6 to abstractions of two values and to abstractions of more than three values.

Although the subject matter has been described in language specific to structural features or methodological acts or both, it is to be understood that the subject matter defined in the appended claims is not necessarily limited to the specific features or acts described above. Rather, the specific features and acts described above are disclosed as example forms of implementing the claims.

What is claimed is:

1. A method in a mobile station that is associated with a base station, the method comprising:
   determining a measure of the quality of a link between the mobile station and the base station by comparing either:
   i) an expected data rate for communications over the link and an actual data rate of communications over the link, wherein the expected data rate takes into account radio frequency power levels of signals received at the mobile station over the link, or
   ii) an expected radio frequency power level for communications over the link and radio frequency power levels of signals received at the mobile station over the link, wherein the expected radio frequency power level takes into account the actual data rate of communications over the link.

2. The method of claim 1, further comprising:
   determining whether to trigger the mobile station to initiate a handoff from the base station based, at least in part, on the measure of the quality of the link.

3. The method of claim 2, further comprising:
   selecting another base station as a target of the handoff, on the expectation that a link with the other base station will experience less interference than that which is experienced on the link between the mobile station and the base station with which the mobile station is associated.

4. The method of claim 1, further comprising:
   determining based, at least in part, on the measure of the quality of the link whether to transfer to the link a communication session currently being carried over a different link between the mobile station and a different base station.

5. The method of claim 1, further comprising:
   using signal strength measurements of the signals as an indication of the power levels.

6. The method of claim 1, further comprising:
   using received channel power indicator measurements of the signals as an indication of the power levels.

7. A mobile station comprising:
   a wireless local area network communication interface through which the mobile station is able to communicate with an access point over a communication link;
   a processor coupled to the wireless local area network communication interface;
   a memory coupled to the processor, the memory storing a link quality measurement module that, when executed by the processor, is arranged to determine a measure of the quality of the link by comparing either:
   i) an expected data rate for communications over the link and an actual data rate of communications over the link, wherein the expected data rate takes into account radio frequency power levels of signals received at the mobile station over the link via the wireless local area network communication interface, or
   ii) an expected radio frequency power level for communications over the link and radio frequency power levels of signals received at the mobile station over the link via the wireless local area network communication interface, wherein the expected radio frequency power level takes into account the actual data rate of communications over the link.

8. The mobile station of claim 7, wherein the memory stores a handoff application that, when executed by the processor, is arranged to determine whether to initiate a handoff from the access point based, at least in part, on the measure of the quality of the link, and is arranged to control the wireless local area network communication interface accordingly.

9. The mobile station of claim 8, wherein the handoff application, when executed by the processor, is arranged to select a base station as a target of the handoff, on the expectation that a link with the base station will experience less interference than that which is experienced on the link between the mobile station and the access point.

10. The mobile station of claim 7, wherein the link quality measurement module, when executed by the processor, is arranged to use signal strength measurements of the signals as an indication of the power levels.

11. The mobile station of claim 7, wherein the link quality measurement module, when executed by the processor, is arranged to use received channel power indicator measurements of the signals as an indication of the power levels.

12. A mobile station comprising:
a wireless local area network communication interface through which the mobile station is able communicate with an access point;
another wireless communication interface through which the mobile station is able to communicate with a base station over a communication link;
a processor coupled to the wireless local area network communication interface and to the other wireless communication interface;
a memory coupled to the processor, the memory storing a link quality measurement module that, when executed by the processor, is arranged to determine a measure of the quality of a link between the mobile station and the base station by comparing either:
i) an expected data rate for communications over the link and an actual data rate for communications over the link, wherein the expected data rate takes into account radio frequency power levels of signals received at the mobile station over the link via the other wireless communication interface, or
ii) an expected radio frequency power level for communications over the link and radio frequency power levels of signals received at the mobile station over the link via the wireless local area network communication interface, wherein the expected radio frequency power level takes into account the actual data rate of communications over the link.

13. The mobile station of claim 12, wherein the memory stores a handoff application module that, when executed by the processor, is arranged to determine whether to initiate a handoff from the access point based, at least in part, on the measure of the quality of the link, and is arranged to control the wireless local area network communication interface accordingly.

14. The mobile station of claim 13, wherein the handoff application module, when executed by the processor, is arranged to determine based, at least in part, on the measure of the quality of the link whether to transfer to the link a communication session currently being carried over a different link between the mobile station and the access point.

15. The mobile station of claim 12, wherein the link quality measurement module, when executed by the processor, is arranged to use signal strength measurements of the signals as an indication of the power levels.

16. The mobile station of claim 12, wherein the link quality measurement module, when executed by the processor, is arranged to use received channel power indicator measurements of the signals as an indication of the power levels.

* * * * *